(12) United States Patent
Kalimuthu et al.

(10) Patent No.: US 7,154,852 B1
(45) Date of Patent: Dec. 26, 2006

(54) DEVICES, SOFTWARES AND METHODS FOR DYNAMIC BANDWIDTH ALLOCATION FOR ATM CONNECTIONS

(75) Inventors: Ramesh Kalimuthu, Freemont, CA (US); Philippe Marcais, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1057 days.

(21) Appl. No.: 09/944,252

(22) Filed: Aug. 30, 2001

(51) Int. Cl.
*H04L 12/26* (2006.01)

(52) U.S. Cl. .................. 370/232; 370/395.21
(58) Field of Classification Search ........... 370/229, 370/230, 231, 232, 233, 234, 395.1, 395.21, 370/395.41, 465
See application file for complete search history.

(56) References Cited

U.S. PATENT DOCUMENTS

| | | | |
|---|---|---|---|
| 6,275,493 B1* | 8/2001 | Morris et al. ............ | 370/395.4 |
| 6,314,105 B1* | 11/2001 | Luong .................... | 370/395.2 |
| 6,366,580 B1* | 4/2002 | Bradley et al. .......... | 370/395.2 |
| 6,526,063 B1* | 2/2003 | St-Amand et al. ....... | 370/395.5 |
| 6,621,788 B1* | 9/2003 | Terasaki .................. | 370/220 |
| 6,925,082 B1* | 8/2005 | Buhrke et al. ............ | 370/393 |
| 2001/0043571 A1* | 11/2001 | Jang et al. ................ | 370/260 |
| 2003/0016676 A1* | 1/2003 | Allen et al. ............. | 370/395.52 |

FOREIGN PATENT DOCUMENTS

WO WO 00/62494 * 10/2000

* cited by examiner

*Primary Examiner*—Kwang Bin Yao
(74) *Attorney, Agent, or Firm*—Marger Johnson & McCollom, P.C.

(57) ABSTRACT

Devices, softwares and methods dynamically allocate bandwidth in ATM SVC connections. If there is an increase in the rate of demand, additional switched virtual circuits are opened for adding bandwidth. If demand decreases, some of the additional switched virtual circuits may be closed. A single pipe need be established for a number of these switched virtual circuits, to not affect operation of the upper network layers.

26 Claims, 5 Drawing Sheets

DEVICES, SOFTWARES AND METHODS FOR DYNAMIC BANDWIDTH ALLOCATION FOR ATM CONNECTIONS

BACKGROUND OF THE INVENTION

1. Field of the Invention

The present invention is related to the field of retransmitting data through networks, and more specifically to devices, softwares and methods for dynamic bandwidth allocation for an asynchronous transfer mode connection of a network.

2. Description of the Related Art

Networks, such as the Internet, generally transmit data in an asynchronous fashion, which is also called asynchronous transfer mode (ATM). A network device, such as a router, receives data and then retransmits it to another router.

A problem with ATM is that data arrives at each router at varying rates. The router, however, reserves a fixed amount of bandwidth for retransmitting the arriving data. The reserved amount of bandwidth is sometimes not enough, while other times it is more than required.

Referring now to FIG. 1A, FIG. 1B, and FIG. 1C, the problem of the fixed amount of bandwidth is illustrated in more detail. A Router-X 12 receives through a connection 14 a group 22 of data packets. Router-X 12 is connected with a Router-Y 32 via a connection 34, and with a Router-Z 42 via a connection 44.

Referring now to FIG. 1B, at a subsequent phase, Router-X 12 stores group 22 of the received packets. In addition, Router-X 12 analyzes the destination of group 22, and determines that group 22 should be retransmitted to Router-Z 42. Accordingly, Router-X 12 establishes an ATM switched virtual circuit (ATM SVC) 46 within connection 44.

Referring now to FIG. 1C, Router-X 12 transmits to router-Z 42 group 22 of data packets via ATM SVC 46. After that ATM SVC 46 remains active, until it is un-established. Additional data groups from the same source and with the same destination may also use ATM SVC 46, without having to establish it again.

This is where the problems start. On the one hand, if no additional data groups are received for a while, ATM SVC 46 remains open anyway, with its bandwidth being unavailable from associated network resources. On the other hand, if a second group 52 of data packets is received which is larger than group 12, more bandwidth would be required. When not accommodated, the data is delayed, which results in jitter at the receiving end.

The problem arises because, once established, ATM SVC 46 has a fixed bandwidth. This fixed bandwidth is determined from a size of the first received group 22 of data packets.

BRIEF SUMMARY OF THE INVENTION

The present invention overcomes these problems and limitations of the prior art.

Generally, the present invention provides devices, softwares and methods for dynamically allocating bandwidth in ATM connections. The invention teaches to open additional switched virtual circuits for adding bandwidth, if there is an increase in the rate of demand. Optionally, if demand decreases, some of the additional switched virtual circuits may be closed.

The invention offers the advantage that the bandwidth is dynamically adjusted according to demand. This will prevent data packets from being delayed, without unduly depriving bandwidth from associated network resources. The invention thus becomes a welcome addition to Voice over Internet Protocol (VoIP) applications in an ATM SVC environment, and other multimedia applications.

Moreover, a single pipe need be established for a number of these switched virtual circuits. Since the upper network layers will continue to administer only a single pipe, no additional protocol considerations are necessary to implement the invention.

The invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for dynamically allocating bandwidth to an ATM connection. The invention is now described in more detail.

Figure 1A:
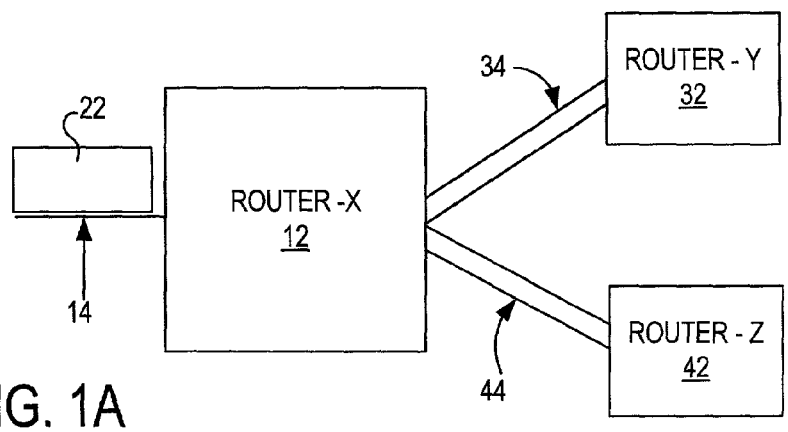
FIGS. 1A, 1B, 1C are sequential snapshots showing establishment of an ATM switched virtual circuit in response to data groups in the prior art.
Figure 1B:
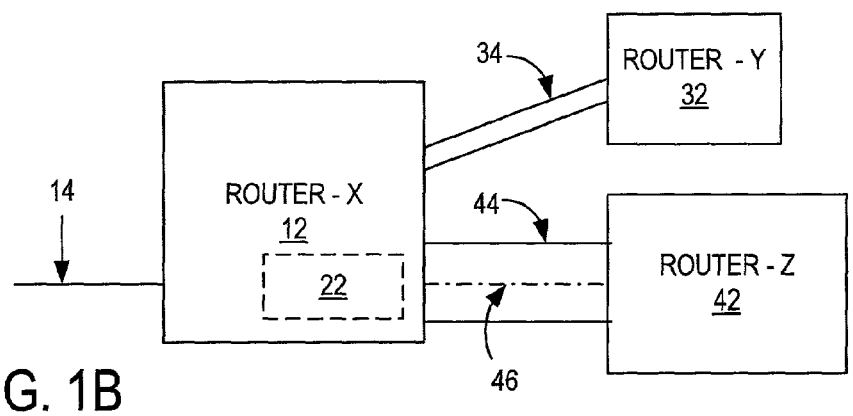
Figure 1C:
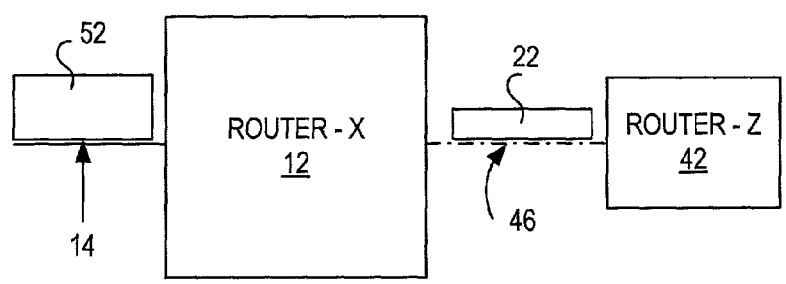
Figure 2:
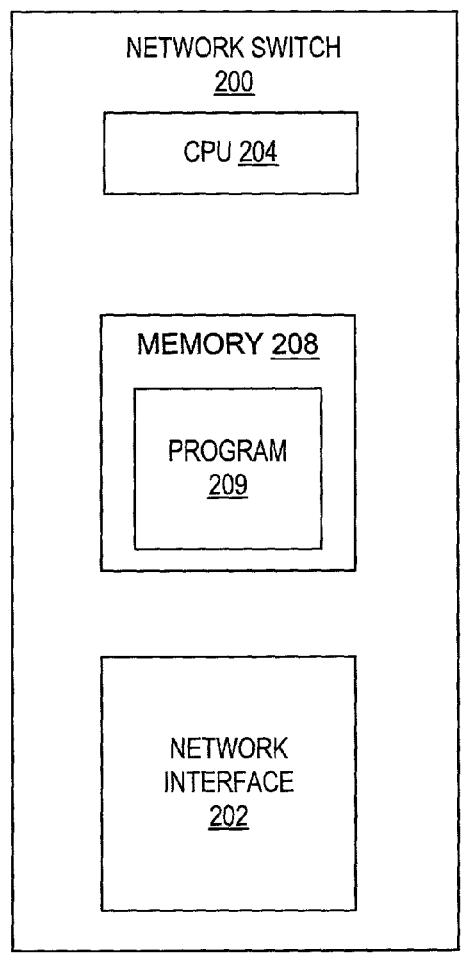
FIG. 2 is a block diagram of a network switch made according to an embodiment of the present invention.

Referring now to FIG. 2, a network switch 200 made according to an embodiment of the invention is described in more detail. Switch 200 may be any network switch, such as a router, a gateway, a bridge, etc.

Switch 200 has a network interface 202 for interfacing with an ATM network, such as the internet. The invention may also be used to retrofit equipment having an ATM network interface.

Switch 200 also has a processor 204 coupled with network interface 202. Processor 204 may be implemented as a Digital Signal Processor (DSP), Central Processing Unit (CPU), or any other equivalent way known in the art.

Switch 200 additionally includes a memory 208, on which a program 209 may reside. Functions of processor 204 may be controlled by program 209, as will become apparent from the below.

It is readily apparent that the present invention may be implemented by one or more devices that include logic circuitry. It may also be implemented by a device that includes a dedicated processor system, which may include a microcontroller or a microprocessor.

The invention additionally provides methods, which are described below. Moreover, the invention provides apparatus that performs, or assists in performing the methods of the invention. This apparatus may be specially constructed for the required purposes, or it may comprise a general-purpose computer selectively activated or reconfigured by a computer program stored in the computer. The methods and algorithms presented herein are not necessarily inherently related to any particular computer or other apparatus. In particular, various general-purpose machines may be used with programs in accordance with the teachings herein, or it may prove more convenient to construct more specialized apparatus to perform the required method steps. The required structure for a variety of these machines will appear from this description.

Useful machines or articles for performing the operations of the present invention include general-purpose digital computers or other similar devices. In all cases, there should be borne in mind the distinction between the method of operating a computer and the method of computation itself. The present invention relates also to method steps for operating a computer and for processing electrical or other physical signals to generate other desired physical signals.

The invention additionally provides a program, and a method of operation of the program. The program is most advantageously implemented as a program for a computing machine, such as a general-purpose computer, a special purpose computer, a microprocessor, etc.

The invention also provides a storage medium that has the program of the invention stored thereon. The storage medium is a computer-readable medium, such as a memory, and is read by the computing machine mentioned above.

A program is generally defined as a sequence of steps leading to a desired result. These steps, also known as instructions, are those requiring physical manipulations of physical quantities. Usually, though not necessarily, these quantities take the form of electrical or magnetic signals capable of being stored, transferred, combined, compared, and otherwise manipulated or processed. When stored, they may be stored in any computer-readable medium. It is convenient at times, principally for reasons of common usage, to refer to these signals as bits, data bits, samples, values, elements, symbols, characters, images, terms, numbers, or the like. It should be borne in mind, however, that all of these and similar terms are associated with the appropriate physical quantities, and that these terms are merely convenient labels applied to these physical quantities.

This detailed description is presented largely in terms of flowcharts, display images, algorithms, and symbolic representations of operations of data bits within a computer readable medium, such as a memory. Such descriptions and representations are the type of convenient labels used by those skilled in programming and/or the data processing arts to effectively convey the substance of their work to others skilled in the art. A person skilled in the art of programming may use this description to readily generate specific instructions for implementing a program according to the present invention. For the sake of economy, however, flowcharts used to describe methods of the invention are not repeated in this document for describing software according to the invention.

Often, for the sake of convenience only, it is preferred to implement and describe a program as various interconnected distinct software modules or features, collectively also known as software. This is not necessary, however, and there may be cases when modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

In the present case, methods of the invention are implemented by machine operations. In other words, embodiments of the program of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Figure 3:
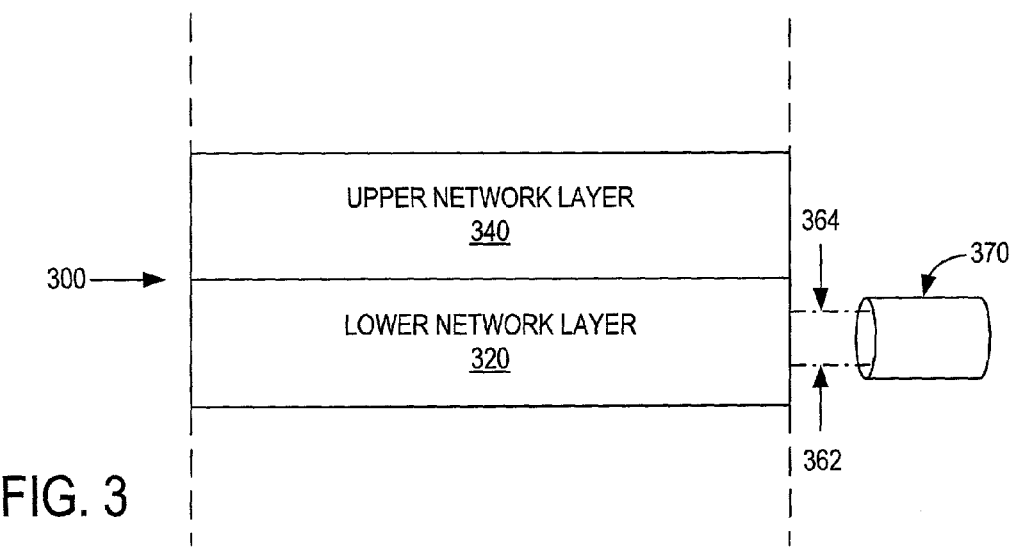
FIG. 3 is a partial block diagram of a software architecture of a network switch made according to an embodiment of the present invention.

Referring now to FIG. 3, a portion 300 is described of a software architecture of a network switch made according to an embodiment of the present invention. Portion 300 includes a lower network layer 320 and an upper network layer 340. It will be understood by person skilled in the art that layer 320 and layer 340 stand for a multiplicity of players according to a greed standards.

According to the invention, two or more ATM switched virtual circuits (SVCs) 362, 364 may be open at the same time. These are preferably administered from lower network layer 320. From the viewpoint of upper network layer 340, however, ATM SVCs 362, 364 appear as a single pipe 370. As such, no special provisions need be made at layer 340 for administering pipe 370, even though it includes more than one ATM SVCs 362, 364.

It will be appreciated that a mechanism of the invention may be placed in a router, and at a low level of a software architecture. This way the mechanism will be transparent to one or more upper network layers, and will not require any additional or new protocols between equipment.

Figure 4:
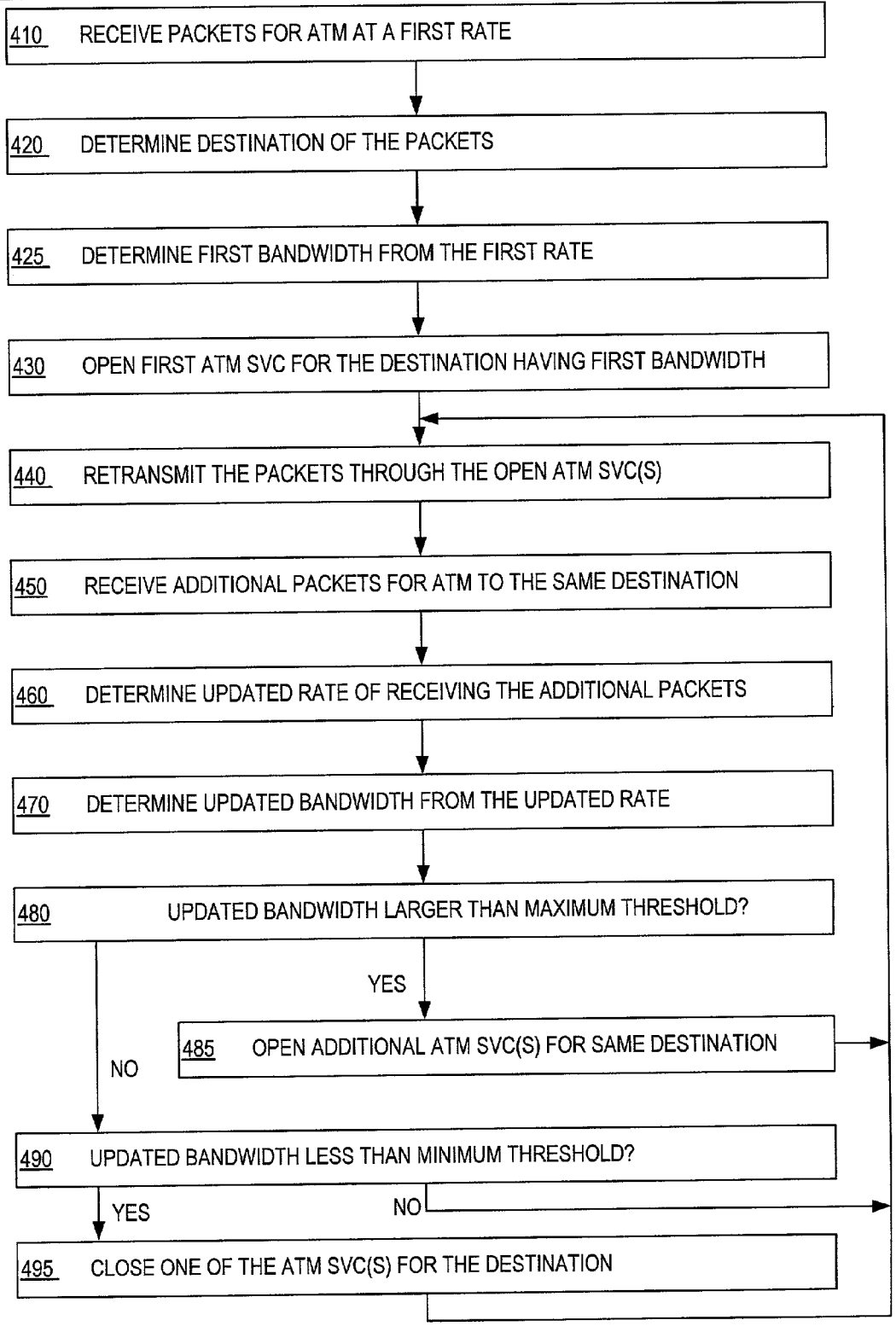
FIG. 4 is a flowchart illustrating a method according to an embodiment of the present invention.

Methods of the invention are now described, referring to FIG. 4 and also FIGS. 5A, 5B, 5C, 5D, 5E, 5F, 5G.

More particularly, FIG. 4 shows a flowchart 400 for illustrating a method according to an embodiment of the invention. The method of flowchart 400 may also be practiced by a network switch made according to the invention.

In addition, FIGS. 5A, 5B, 5C, 5D, 5E, 5F, 5G are used to show snapshots resulting from specific instances of applying the method of flowcharts 400.

Figure 5A:
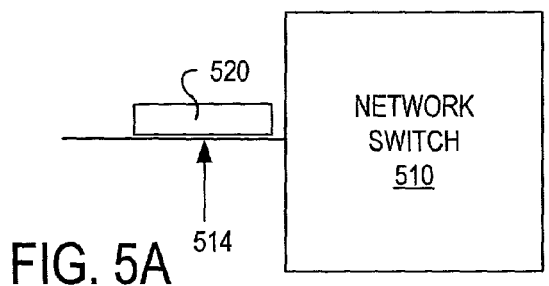
FIGS. 5A, 5B, 5C, 5D, 5E, 5F, 5G are sequential snapshots showing establishments of ATM switched virtual circuits in response to data groups in accordance with the present invention.

According to a box 410, packets are received for ATM retransmission. Referring to FIG. 5A, packets 520 are received by a network switch 510 through a line 514. Packets 520 are received at a first rate. The first rate represents a demand level.

Figure 5B:
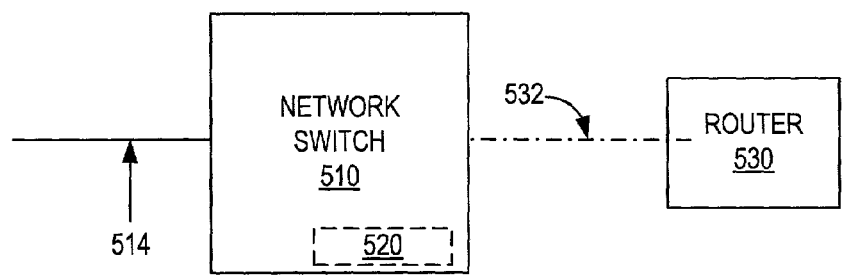

According to a next box 420, a destination of the received packets is determined. Referring to FIG. 5B, the destination of packets 520 is a router 530.

According to a next box 425, a first bandwidth is determined from the first rate.

According to a next box 430, a first ATM SVC is opened for the destination, having the first bandwidth. Referring to FIG. 5B, first ATM SVC 532 is opened with router 530.

Figure 5C:
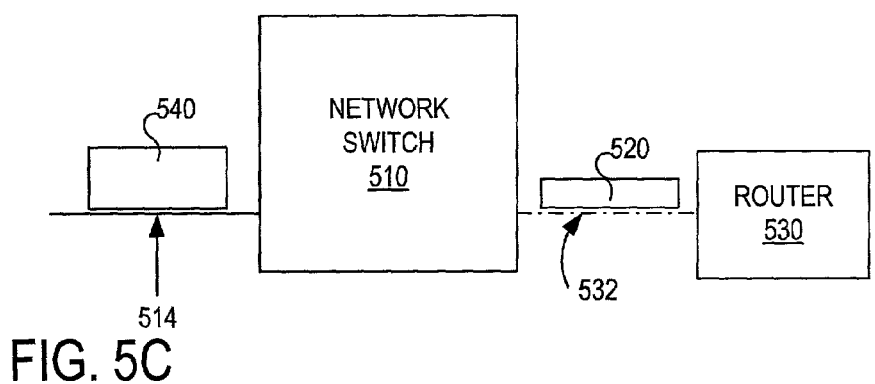

According to a next box 440, the packets are retransmitted through the open ATM SVC(s). Referring to FIG. 5C, packets 520 are retransmitted to router 530 through the first ATM SVC 532.

According to a next box 450, additional packets are received for ATM to the same destination. Referring to FIG. 5C, packets 540 are received by network switch 510 through line 514.

According to a next box 460, an updated rate is determined of the additional received packets.

Figure 5D:
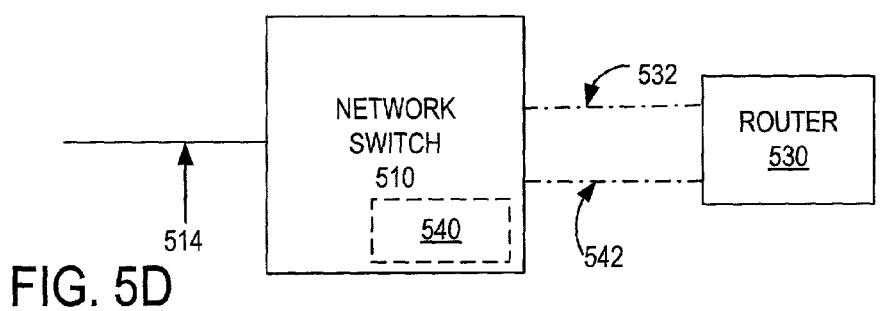

According to a next box 470, an updated bandwidth is determined from the updated rate. Referring to FIG. 5D, packets 540 are stored in a memory of network switch 510 during the determination.

According to a next box 480, it is determined whether the updated bandwidth is larger than maximum threshold. The maximum threshold may be a preset fraction of the first bandwidth, such as 80% of the first bandwidth.

If yes, then according to a next box 485, at least one additional ATM SVC is opened for the same destination. Referring to FIG. 5D, an additional ATM SVC 542 is opened, within the same pipe as ATM SVC 532.

Figure 5E:
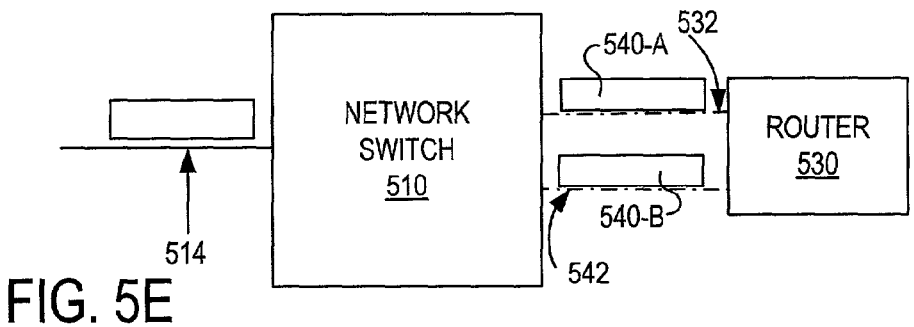

Then execution returns to box 440, where the packets are retransmitted through the open ATM SVC(s). Referring to FIG. 5E, packets 540 are separated in two groups, 540-A and 540-B for transmission through the pipe to router 530. Group 540-A travels through ATM SVC 532, and group 540-B travels through ATM SVC 542. This prevents jitter at the final destination, by servicing the larger group of packets 540 without delaying them.

Executing again through box 450, additional packets 560 are received for ATM to the same destination. Referring to FIG. 5E, packets 540 are received by network switch 510 through line 514.

According to next box 460, an updated rate is determined of the additional received packets.

Figure 5F:
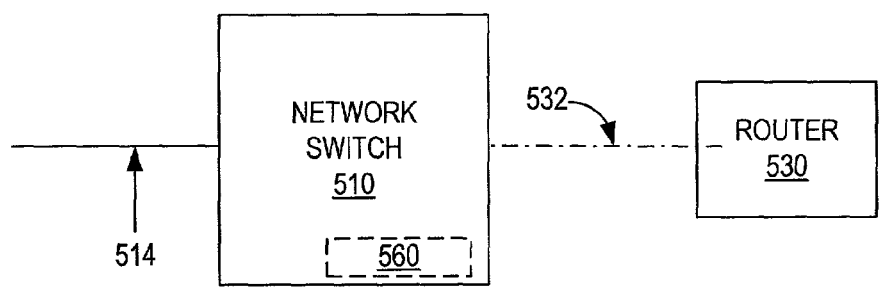

According to next box 470, an updated bandwidth is again determined from the updated rate. Referring to FIG. 5F, packets 560 are stored in the memory of network switch 510 during the determination.

According to next box 480, it is determined whether the latest updated bandwidth is larger than maximum threshold.

If not, then according to a next box 490, it is determined whether the latest updated rate is less than minimum threshold. The minimum threshold may be a fraction of the first bandwidth, such as 30% of the first bandwidth. Equivalently, the minimum threshold may be a fraction of the second bandwidth, etc.

If yes, then according to a next box 495, one of the ATM SVCs for the destination is closed. Referring to FIG. 5F, only the first ATM SVC 532 is shown as it remains open, because the second ATM SVC 542 has been closed. Equivalently, the second ATM SVC 542 may remain open, while the first ATM SVC 532 may be closed.

Figure 5G:
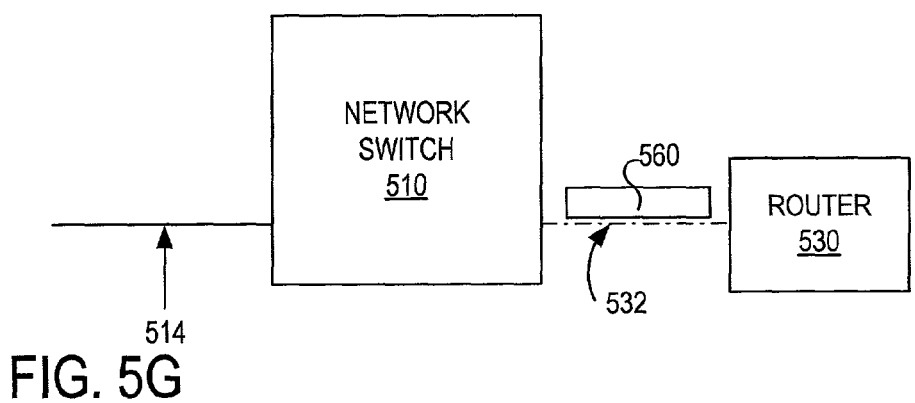

Execution then returns to box 440, where the packets are retransmitted through the open ATM SVC(s). Referring to FIG. 5G, packets 560 are transmitted to router 530 through the open ATM SVC 532.

If, at box 490, it is determined that the latest updated rate is not less than the minimum threshold, then none of the ATM switched virtual circuits (ATM SVCs) is closed. Execution returns again to box 440, where the packets are retransmitted through the open ATM SVC(s).

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiment as disclosed and illustrated herein are not to be considered in a limiting sense. Indeed, it should be readily apparent to those skilled in the art in view of the present description that the invention may be modified in numerous ways. For example, while only a second ATM SVC was shown, the invention extends to a large number of them.

The inventor regards the subject matter of the invention to include all combinations and subcominations of the various elements, features, functions and/or properties disclosed herein.

The following claims define certain combinations and subcombinations, which are regarded as novel and non-obvious. Additional claims for other combinations and sub-combinations of features, functions, elements and/or properties may be presented in this or a related document.

The invention claimed is:

1. A device comprising:
   a network interface for coupling to a network; and
   a processor coupled with the network interface, wherein the processor is adapted to;
   receive first packets for asynchronous transmission to a network destination;
   open a first switched virtual circuit that accommodates the network destination;
   transmit the first packets through the first switched virtual circuit;
   receive second packets for asynchronous transmission to the network destination after transmitting the first packets;
   open a second switched virtual circuit concurrently with the first switched virtual circuit to accommodate the network destination; and
   transmit the second packets through both the first and the second switched virtual circuits at a same time;
   maintain the first and second switched virtual circuits concurrently according to a comparison of an updated rate and a minimum threshold.

2. The device of claim 1, wherein the processor is further adapted to:
   receive third packets for asynchronous transmission to the network destination after transmitting the second packets;
   determine a rate of receiving the third packets;
   determine a bandwidth associated with the third packets from the rate of receiving the third packets; and
   if the bandwidth associated with the third packets is less than the minimum threshold, close one of the first and second switched virtual circuits, and then transmit the third packets through only the open one of the first and second switched virtual circuits.

3. The device of claim 1, wherein the processor is further adapted to:
   determine a rate of receiving the second packets; and
   determine a bandwidth associated with the second packets from the rate of receiving the second packets,
   wherein the second switched virtual circuit is opened when the bandwidth associated with the second packets exceeds a threshold of the first switched virtual circuit.

4. The device of claim 3, wherein
   the first switched virtual has a bandwidth associated with the first packets, and
   the threshold of the first switched virtual circuit is a preset fraction of the bandwidth associated with the first packets.

5. The device of claim 4, wherein the processor is further adapted to:
   determine a rate of receiving the first packets; and
   determine the bandwidth associated with the first packets from the rate of receiving the first packets.

6. The device of claim 1, wherein
the first and second switched virtual circuits are administered by a lower network layer, and
the first and second switched virtual circuits behave as a single pipe from a viewpoint of an upper network layer which is on top of the lower network layer.

7. The device of claim 1, wherein the processor is further adapted to maintain the first and second switched virtual circuits when the updated rate is not less than the minimum threshold.

8. A device comprising:
means for receiving first packets for asynchronous transmission to a network destination;
means for opening a first switched virtual circuit that accommodates the network destination;
means for transmitting the first packets through the first switched virtual circuit;
means for receiving second packets for asynchronous transmission to the network destination after transmitting the first packets;
means for determining whether a rate of receiving the second packets exceeds a maximum threshold;
means for opening a second switched virtual circuit to accommodate the network destination in response to a determination that the rate of receiving the second packets exceeds a maximum threshold; and
means for concurrently transmitting the second packets through both the first and the second switched virtual circuits;
means for closing one of the first or second switched virtual circuits according to a comparison of an updated rate and a minimum threshold.

9. The device of claim 8, further comprising:
means for receiving third packets for asynchronous transmission to the network destination after transmitting the second packets;
means for determining a rate of receiving the third packets;
means for determining a bandwidth associated with the third packets from the rate of receiving the third packets; and
if the bandwidth associated with the third packets is less than the minimum threshold, means for closing one of the first and second switched virtual circuits, and then transmitting the third packets through only the open one of the first and second switched virtual circuits.

10. The device of claim 8, further comprising:
means for determining a rate of receiving the second packets; and
means for determining a bandwidth associated with the second packets from the rate of receiving the second packets,
wherein the second switched virtual circuit is opened when the bandwidth associated with the second packets exceeds a threshold of the first virtual switched circuit.

11. The device of claim 10, wherein
the first switched virtual circuit has a bandwidth associated with the first packets and
the threshold of the first virtual switch circuit is a preset fraction of the bandwidth associated with the first packets.

12. The device of claim 11, further comprising:
determining a rate of receiving the first packets; and
determining the bandwidth associated with the first packets from the rate of receiving the first packets.

13. The device of claim 8, wherein
the first and second switched virtual circuits are administered by a lower network layer, and
the first and second switched virtual circuits behave as a single pipe from a viewpoint of an upper network layer which is on top of the lower network layer.

14. The device of claim 8, wherein one of the first or second switched virtual circuits are closed when the updated rate is less than the minimum threshold.

15. An article comprising: a storage medium, said storage medium having stored thereon instructions, that, when executed by at least one device, result in:
receiving first packets for asynchronous transmission to a network destination;
opening a first switched virtual circuit that accommodates the network destination;
transmitting the first packets through the first switched virtual circuit;
receiving second packets for asynchronous transmission to the network destination after transmitting the first packets;
opening a second switched virtual circuit to accommodate the network destination;
transmitting the second packets through both the first and the second switched virtual circuits; and
maintaining the first and second switched virtual circuits according to a comparison of an updated rate and a minimum threshold;
wherein the first and second virtual switched circuits remain open at a same time and a first portion of packets for a connection is transmitted through the first switched virtual circuit while a second portion of packets for the connection is transmitted through the second switched virtual circuit.

16. The article of claim 15, wherein the instructions further result in:
receiving third packets for asynchronous transmission to the network destination after transmitting the second packets;
determining a rate of receiving the third packets;
determining a bandwidth associated with the third packets from the rate of receiving the third packets; and
if the bandwidth associated with the third packets is less than the minimum threshold of the second switched virtual circuit, closing one of the first and second switched virtual circuits, and then transmitting the third packets through only the open one of the first and second switched virtual circuits.

17. The article of claim 15, wherein the instructions further result in:
determining a rate of receiving the second packets; and
determining a bandwidth associated with the second packets from the rate of receiving the second packets,
wherein the second switched virtual circuit is opened when the bandwidth associated with the second packets exceeds a threshold of the first switched virtual circuit.

18. The article of claim 17, wherein
the first switched virtual circuit has a bandwidth associated with the first packets, and
the threshold of the first switched virtual circuit is a preset fraction of the bandwidth associated with the first packets.

19. The article of claim 18, wherein the instructions further result in:
determining a rate of receiving the first packets; and
determining the bandwidth associated with the first packets from the rate of receiving the first packets.

20. The article of claim 15, wherein the connection is an asynchronous transfer mode (ATM) connection.

21. A method comprising:
receiving first packets for asynchronous transmission to a network destination;
opening a first switched virtual circuit that accommodates the network destination;
transmitting the first packets through the first switched virtual circuit;
receiving second packets for asynchronous transmission to the network destination after transmitting the first packets;
opening a second switched virtual circuit to accommodate the network destination; and
transmitting the second packets through both the first and the second switched virtual circuits,
closing either the first or second switched virtual circuits according to a comparison of an updated rate and a minimum threshold.

22. The method of claim 21, further comprising:
receiving third packets for asynchronous transmission to the network destination after transmitting the second packets;
determining a rate of receiving the third packets;
determining a bandwidth associated with the third packets from the rate of receiving the third packets; and
if the bandwidth associated with the third packets is less than the minimum threshold of the second virtual switched circuits, closing one of the first and second switched virtual circuits, and then transmitting the third packets through only the open one of the first and second switched virtual circuits.

23. The method of claim 21, further comprising:
determining a rate of receiving the second packets; and
determining a bandwidth associated with the second packets from the rate of receiving the second packets,
wherein the second switched virtual circuit is opened when the bandwidth associated with the second packets exceeds a threshold of the first switched virtual circuit.

24. The method of claim 23, wherein
the first switched virtual circuit has a bandwidth associated with the first packets, and
the threshold of the first switched virtual circuit is a preset fraction of the bandwidth associated with the first packets.

25. The method of claim 24, further comprising:
determining a rate of receiving the first packets; and
determining the bandwidth associated with the first packets from the rate of receiving the first packets.

26. The method of claim 21, wherein the closing either the first or second switched virtual circuits according to a comparison further comprises closing either the first or second switched virtual circuits when the updated rate is less than the minimum threshold.

* * * * *